No. 869,010. PATENTED OCT. 22, 1907.
E. G. McINTYRE.
REEL.
APPLICATION FILED APR. 17, 1907.
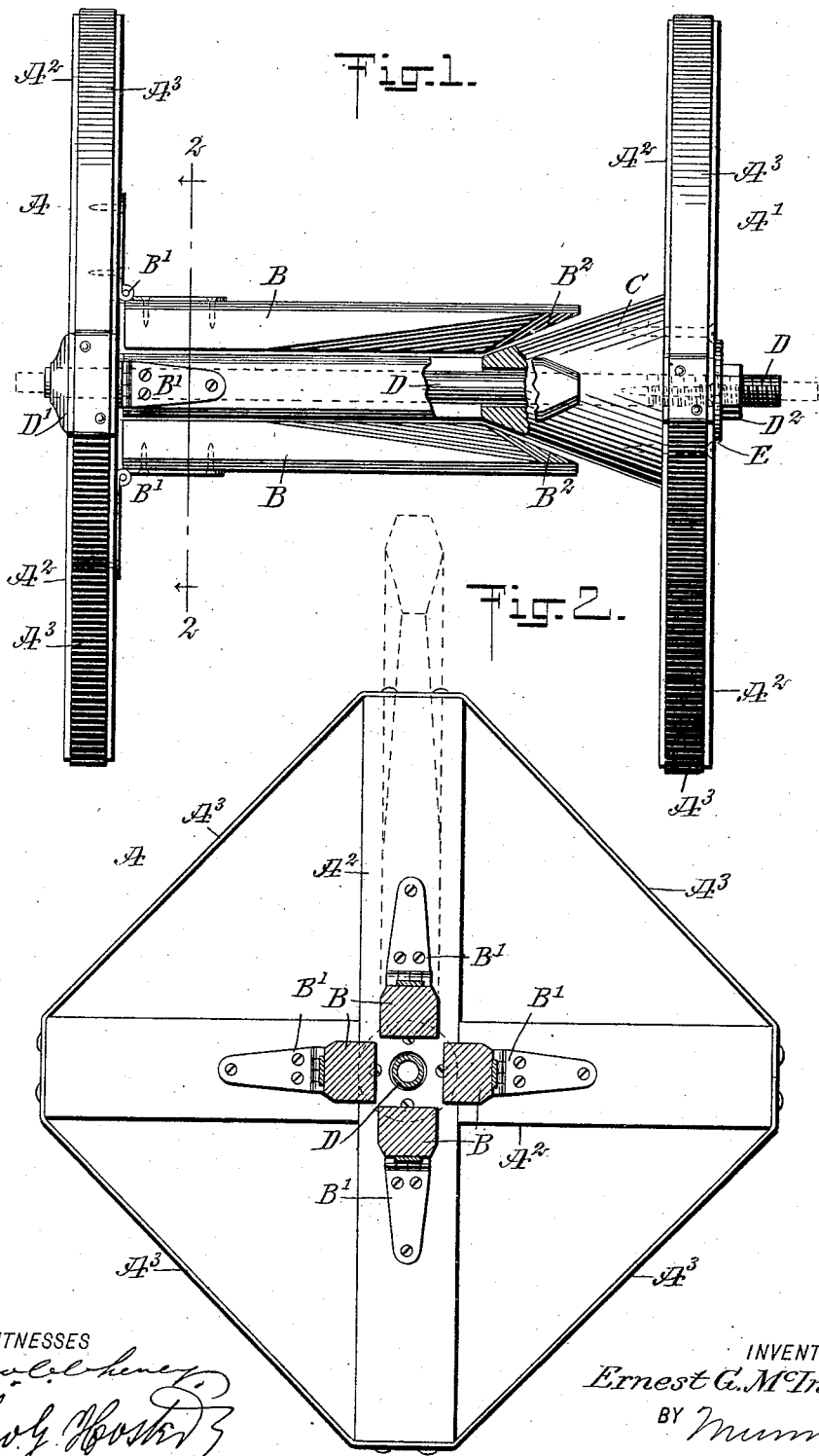
WITNESSES
INVENTOR
Ernest G. McIntyre
BY Munn & Co.
ATTORNEYS

UNITED STATES PATENT OFFICE.

ERNEST G. McINTYRE, OF BUTTE, MONTANA.

REEL.

No. 869,010.  Specification of Letters Patent.  Patented Oct. 22, 1907.

Application filed April 17, 1907. Serial No. 368,764.

*To all whom it may concern:*

Be it known that I, ERNEST G. MCINTYRE, a citizen of the United States, and a resident of Butte, in the county of Silverbow and State of Montana, have invented a new and Improved Reel, of which the following is a full, clear, and exact description.

The object of the invention is to provide a new and improved reel for twine or rope, and arranged to hold the ball of twine or the coil of rope securely in position, to insure convenient and quick unreeling whenever it is desired to do so, and without danger of the rope or twine becoming entangled.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in both views.

Figure 1 is a front elevation of the improvement, parts being section, and Fig. 2 is a sectional side elevation of the same on the line 2—2 of Fig. 1.

The heads A and A′ of the reel are each preferably made in the form of cross arms $A^2$, which are rigidly connected with each other at their outer ends by band irons $A^3$, as plainly indicated in the drawings. The expanding arms B are connected at one end by strap hinges B′ with the inner face of the head A, so as to extend at an angle thereto and towards the other head A′, the several expanding arms B being arranged in a circle, the center of which coincides with the axis of the reel. The free ends of the expanding arms B are provided at their under sides with bevels $B^2$, adapted to be engaged by a cone-shaped expander C, attached to or formed on the inner face of the reel head A′, so that when the latter is moved towards the head A then the conical expander C expands or swings the arms B outward, for the latter to firmly engage the inner surface of the hollow center of the ball of twine or coil of rope to be held on the reel. A bolt D extends centrally through the heads A, A′, and the bolt head D′ of the bolt D abuts against the outer face of the reel head A, and a nut $D^2$ screwing on the bolt D abuts against a washer E held on the outer face of the other reel head A′. Now by screwing up the nut $D^2$, the reel head A′ is readily moved towards the reel head A, so that the ball of twine or coil of rope held on the corresponding arms B is securely fastened to the corresponding arms by expanding the latter against the inner surface of the ball of twine or coil of rope, at the same time the reel heads A, A′ are brought with their inner faces firmly against the ends of the ball of twine or coil of rope.

In order to place the ball of twine or coil of rope in position on the reel, it is necessary to unscrew the nut $D^2$ and remove the washer E and the head A′ from the bolt D, and then the ball of twine or coil of rope is slipped onto the expanding arms B, after which the head A′, the washer E and the nut $D^2$ are replaced and the nut screwed up, for securely fastening the ball of twine or the coil of rope in position on the reel. Now by the arrangement described the twine or rope can be readily unwound from the reel without danger of entangling.

The bolt D is preferably made hollow for receiving a rod projecting beyond the ends of the hollow bolt, to conveniently support the reel from a suitable rack.

Having thus described my invention, I claim as new and desire to secure by Letters Patent:

1. A reel comprising reel heads, a plurality of expanding arms hinged at one end to the inner face of the said heads, the free ends of the said expanding arms having beveled under surfaces, a conical expander on the inner face of the other reel head and adapted to engage the said beveled under surfaces of the said expanding arms, and means for drawing the heads towards each other.

2. A reel comprising reel heads, a plurality of expanding arms hinged at one end to the inner face of the said heads, the free ends of the said expanding arms having beveled under surfaces, a conical expander on the inner face of the other reel head and adapted to engage the said beveled under surfaces of the said expanding arms, and a bolt extending centrally through the said heads, the head of the bolt engaging the outer face of one of the heads and the washer and nut of the bolt engaging the outer face of the other head.

3. A reel comprising reel heads, a plurality of expanding arms hinged at one end to the inner face of the said heads, the free ends of the said expanding arms having beveled under surfaces, a conical expander on the inner face of the other reel head and adapted to engage the said beveled under surfaces of the said expanding arms, and a bolt extending centrally through the said heads, the head of the bolt engaging the outer face of one of the heads and the washer and nut of the bolt engaging the outer face of the other head, the said bolt being hollow for the passage of a reel supporting rod.

In testimony whereof I have signed my name to this specification in the presence of two subscribing witnesses.

ERNEST G. McINTYRE.

Witnesses:
ROBT. G. HUSTON,
ROBERT LAWBERT.